(12) United States Patent
Welbourn et al.

(10) Patent No.: US 10,889,996 B2
(45) Date of Patent: Jan. 12, 2021

(54) ENGINEERED FLOORING PRODUCT AND METHOD OF MANUFACTURING THEREOF

(71) Applicant: CORE INNOVATIONS LIMITED, Hong Kong (CN)

(72) Inventors: Derek Welbourn, Vancouver (CA); Jianming Chen, Jiangsu (CN); Jun Zhang, Hubei (CN)

(73) Assignee: Core Innovations Limited, Kowloon (HK)

( * ) Notice: Subject to any disclaimer, the term of this patent is extended or adjusted under 35 U.S.C. 154(b) by 0 days.

(21) Appl. No.: 16/340,840

(22) PCT Filed: Oct. 11, 2016

(86) PCT No.: PCT/CN2016/101758
§ 371 (c)(1),
(2) Date: Apr. 10, 2019

(87) PCT Pub. No.: WO2018/068197
PCT Pub. Date: Apr. 19, 2018

(65) Prior Publication Data
US 2019/0264449 A1  Aug. 29, 2019

(51) Int. Cl.
*B29C 39/00* (2006.01)
*E04F 15/02* (2006.01)
(Continued)

(52) U.S. Cl.
CPC ...... *E04F 15/02038* (2013.01); *B29C 39/003* (2013.01); *B29C 39/025* (2013.01);
(Continued)

(58) Field of Classification Search
CPC ....... B23B 13/00; B29C 41/00; C04B 22/066; C04B 28/30; C04B 28/32
See application file for complete search history.

(56) References Cited

U.S. PATENT DOCUMENTS 3,778,304 A * 12/1973 Thompson ............... C08J 9/35
                                                          427/243
4,003,752 A *  1/1977 Isohata .................. B32B 13/04
                                                          106/689
(Continued)

FOREIGN PATENT DOCUMENTS

CN    1136542 A  * 11/1996  ............ C04B 28/02
CN    2591124 Y    12/2003
(Continued)

OTHER PUBLICATIONS

Zhang, CN 105948690 A machine translation, Mar. 30, 2016, entire machine translation (Year: 2016).*
(Continued)

*Primary Examiner* — Atul P. Khare
(74) *Attorney, Agent, or Firm* — Stephen T. Murphy Law LLC; Peter D. Meyer; Stephen T. Murphy (57) ABSTRACT

An engineered flooring product suitable for indoor or outdoor flooring applications, and a method of manufacturing thereof are provided. The engineered flooring product comprises a core layer, the core layer comprising: (i) a hydrate compound comprising magnesium hydroxide and magnesium chloride; (ii) one or more hydrate compounds each comprising magnesium hydroxide and magnesium sulfate; and (iii) one or more stabilizing agents. The hydrate compounds are derived at least in part from magnesium oxide. The core layer has a composition that is free of PVC and other plastic-based materials and is selected to provide one or more desired physical properties such as, but not limited to, a desired degree of water resistance, durability, and thermal expansion and contraction. The core layer preferably has a composition that provides a thermal expansion coefficient equivalent to or comparable to concrete.

20 Claims, 3 Drawing Sheets

(51) Int. Cl.
*B32B 3/06* (2006.01)
*B32B 5/18* (2006.01)
*B32B 7/12* (2006.01)
*B32B 9/00* (2006.01)
*E04F 15/10* (2006.01)
*B32B 13/00* (2006.01)
*E04F 15/08* (2006.01)
*C04B 22/06* (2006.01)
*C04B 28/32* (2006.01)
*B32B 13/04* (2006.01)
*B29C 39/10* (2006.01)
*B29C 39/02* (2006.01)
*B29C 39/12* (2006.01)

(52) U.S. Cl.
CPC ............ B29C 39/10 (2013.01); B29C 39/123 (2013.01); B32B 3/06 (2013.01); B32B 5/18 (2013.01); B32B 7/12 (2013.01); B32B 9/005 (2013.01); B32B 13/00 (2013.01); B32B 13/04 (2013.01); C04B 22/066 (2013.01); C04B 28/32 (2013.01); E04F 15/08 (2013.01); E04F 15/107 (2013.01); *B32B 2307/554* (2013.01); *B32B 2307/7265* (2013.01); *B32B 2419/04* (2013.01)

(56) References Cited

U.S. PATENT DOCUMENTS

| | | | |
|---|---|---|---|
| 4,419,196 A | 12/1983 | Beckerick | |
| 6,006,486 A | 12/1999 | Moriau | |
| 6,023,907 A | 2/2000 | Pervan | |
| 7,654,326 B1 * | 2/2010 | Santra | C09K 8/487 166/292 |
| 9,453,349 B2 * | 9/2016 | Pallon | E04F 15/042 |
| 2008/0145550 A1 * | 6/2008 | Caine | C04B 28/32 427/421.1 |

FOREIGN PATENT DOCUMENTS

| | | | | |
|---|---|---|---|---|
| CN | 101892057 A | | 11/2010 | |
| CN | 103030360 A | * | 4/2013 | |
| CN | 105442790 A | | 3/2016 | |
| CN | 105753428 A | | 7/2016 | |
| CN | 105948690 A | * | 9/2016 | |
| CN | 105948690 A | | 9/2016 | |
| DE | 10 2007 026638 A1 | | 12/2008 | |
| EP | 1493879 A1 | | 1/2005 | |
| GB | 615316 A | * | 1/1949 | C04B 28/105 |
| GB | 1486870 A | | 9/1977 | |
| GB | 1486870 A | * | 9/1977 | E04C 2/044 |
| JP | 06271367 A | * | 9/1994 | C04B 28/30 |
| KR | 20160025986 A | | 3/2016 | |
| WO | 2009/059908 A2 | | 5/2009 | |
| WO | 2012/061300 A2 | | 5/2012 | |

OTHER PUBLICATIONS

Supplemental European Search Report issued in EP 16 91 8810.
International Search Report and Written Opinion issued in PCT/CN2016/101758.

* cited by examiner

ENGINEERED FLOORING PRODUCT AND METHOD OF MANUFACTURING THEREOF

TECHNICAL FIELD

The present disclosure relates to an engineered flooring product suitable for indoor or outdoor flooring applications, and a method of manufacturing thereof.

BACKGROUND

Wood is commonly used as a predominant material in finished flooring products. For example, wood may be found in its natural form in traditional hardwood floors or as a wood fibre component of a backing or core layer in engineered and laminate flooring products. However, flooring products comprising wood as the predominant material are susceptible to moisture-related issues. For example, an accumulation of moisture may cause wood flooring products (e.g. hardwood) to warp or twist, or laminate flooring to irreversibly swell, and may limit the environment and settings in which flooring products comprising wood as the predominant material may be used.

Owing at least in part to the limitations of flooring products comprising wood as the predominant material, the flooring industry has witnessed an increase in popularity of composite and engineered flooring products. At least some of such composite and engineered flooring products offer similar visual appeal and have comparable performance to, or better performance than, traditional flooring materials like hardwood and stone.

There are various types of composite and engineered flooring products. For example, some engineered flooring products have core layers comprising polyvinyl chloride ("PVC") and/or other plastic compounds. A top layer from an already established flooring category, such as a vinyl product or plastic laminate, may be coupled to the core layer to provide the flooring product with a décor and/or wear layer. Examples of engineered flooring products include, but are not limited to, luxury vinyl tile ("LVT") and wood-plastic composite ("WPC") products. However, the plastic components within both the LVT and WPC products are generally susceptible to thermal expansion and contraction. Such thermal expansion and contraction may eventually lead to, or may make plastic-based products prone to, gapping between floor planks, thereby at least resulting in decreased aesthetic look and appeal, accumulation of dirt and grime therebetween, limitations on the scale of product installation, or unsuitability for some uses or combinations of raw materials (e.g. stone or tile).

Commercially available engineered flooring products commonly use a tongue and groove interlocking system to interconnect flooring planks. An example of a tongue and groove system is the "click-lock" flooring system (e.g. U.S. Pat. Nos. 6,023,907, 6,006,486, incorporated herein by reference in its entirety). In the "click-lock" flooring system, opposite sides of flooring planks are milled with specially shaped complementary tongues and grooves such that the flooring planks may be securely locked together without glue and/or without adhering the flooring planks to the subfloor. While the "click-lock" system has been successfully incorporated into wood, engineered wood, and vinyl flooring products and other similar categories of flooring products, the "click-lock" system has not been as successfully integrated into the tile and stone flooring products owing to technical challenges in those categories such as, but not limited to, the brittleness of tile and stone.

There is a continued desire in the flooring industry for cost-effective flooring products and/or and easy-to-install (e.g. "click-lock" flooring system) flooring products that have desirable physical properties such as high durability, high water-resistance, high fire-resistance, high moth-resistance, high bacteria resistance, and high heat and/or cold resistance. However, flooring products that generally possess these desirable characteristics are typically difficult to install and/or have relatively higher manufacturing costs.

One particular challenge with conventional engineered flooring products is that components of a flooring product tend to expand and contract at different rates, e.g. due to temperature change or moisture content. More particularly, certain conventional engineered flooring products have select veneers that do not expand and contract at the same or a similar rate with other components in the flooring products, thereby causing the veneers to crack or to be otherwise damaged. For example, a stone veneer does not tend to expand or contract at the same rate as a wood-fibre composite backing layer in the presence of moisture, and this may cause the stone veneer to crack when the backing layer expands or contracts.

Another challenge with conventional engineered flooring products is providing products that are not harmful to the environment or to human health. For example, some known vinyl-based flooring products are composed of recycled PVC to reduce environmental burden. However, such recycled PVC have been known to contain heavy metals such as mercury, lead and arsenic, that are detrimental to human health. While widespread use of recycled PVC in flooring products has been curbed and replaced with the use of virgin PVC that does not contain heavy metal, the manufacture of virgin PVC removes the environmental benefit of using recycled materials. In another example, formaldehyde was commonly introduced into a flooring product as a glue component that was used to bind the various components of a flooring product together. However, the off-gassing of formaldehyde from the flooring product reduces air quality, and prolonged exposure to formaldehyde fumes is also detrimental to human health.

SUMMARY

The present disclosure relates to an engineered flooring product suitable for indoor or outdoor flooring applications, and a method of manufacturing thereof.

According to an aspect of the disclosure, there is an engineered flooring product comprising a core layer having a first surface and a second surface opposite the first surface, the core layer comprising: (a) a first hydrate compound comprising magnesium hydroxide and magnesium chloride; (b) one or more second hydrate compounds comprising magnesium hydroxide and magnesium sulfate; and (c) one or more stabilizing agents.

The core layer can comprise predominantly the first hydrate compound comprising magnesium hydroxide and magnesium chloride and the one or more second hydrate compounds comprising magnesium hydroxide and magnesium sulfate. For example, the combination of the first hydrate compound comprising magnesium hydroxide and magnesium chloride and the one or more second hydrate compounds comprising magnesium hydroxide and magnesium sulfate can comprise 40-95% by weight of the composition of the core layer.

The first hydrate compound comprising magnesium hydroxide and magnesium chloride can be $5Mg(OH)_2 \cdot MgCl_2 \cdot 8H_2O$. The one or more second hydrate compounds comprising magnesium hydroxide and magnesium sulfate can comprise $5Mg(OH)_2 \cdot MgSO_4 \cdot 5H_2O$, wherein the $5Mg(OH)_2 \cdot MgSO_4 \cdot 5H_2O$ can be in combination with $5Mg(OH)_2 \cdot MgSO_4 \cdot 3H_2O$ and/or $3Mg(OH)_2 \cdot MgSO_4 \cdot 8H_2O$.

The core layer can further comprise a third hydrate compound comprising magnesium potassium phosphate. The core layer can further comprise a fourth hydrate compound comprising magnesium phosphate tribasic.

the core layer can have a thermal expansion coefficient on the order of about $10 \times 10^{-6/\circ}$ C.

According to another aspect of the disclosure, there is a method of manufacturing an engineered flooring product comprising a core layer having a first surface and a second surface opposite the first surface, the core layer comprising a first hydrate compound comprising magnesium hydroxide and magnesium chloride, one or more second hydrate compounds comprising magnesium hydroxide and magnesium sulfate, and one or more stabilizing agents, the method comprising: (a) mixing at least magnesium oxide, magnesium chloride, magnesium sulfate, the one or more stabilizing agents, and water in a mixer, thereby forming a raw material slurry; (b) spreading a first layer of the raw material slurry onto a cull plate; and (c) curing the first layer of raw material slurry.

The method can further comprise laying a sheet of stabilizing material on the first layer of the raw material slurry and prior to, curing the first layer of raw material slurry, and spreading a second layer of the raw material slurry on the sheet of stabilizing material.

This summary does not necessarily describe the entire scope of all aspects of the disclosure. Other aspects, features and advantages will be apparent to those of ordinary skill in the art upon review of the following description of specific embodiments.

BRIEF DESCRIPTION OF THE DRAWINGS

In the accompanying drawings, which illustrate one or more exemplary embodiments.

DETAILED DESCRIPTION

Directional terms such as "top", "bottom", "upwards", "downwards", "vertically", and "laterally" are used in the following description for the purpose of providing relative reference only, and are not intended to suggest any limitations on how any article is to be positioned during use, or to be mounted in an assembly or relative to an environment. Any element expressed in the singular form also encompasses its plural form. Any element expressed in the plural form also encompasses its singular form. The use of the word "a" or "an" when used herein in conjunction with the term "comprising" may mean "one", but it is also consistent with the meaning of "one or more", "at least one", and "one or more than one".

As used herein, the terms "comprising", "having", "including", and "containing", and grammatical variations thereof, are inclusive or open-ended and do not exclude additional, un-recited elements and/or method steps. The term "consisting essentially of" when used herein in connection with a composition, use or method, denotes that additional elements, method steps or both additional elements and method steps may be present, but that these additions do not materially affect the manner in which the recited composition, method or use functions. The term "consisting of" when used herein in connection with a composition, use or method, excludes the presence of additional elements and/or method steps.

As used herein, the term "predominant" means "the largest component of".

As used herein, the term "about" when followed by a recited value means plus or minus 10% of the recited value.

As used herein, the term "hydrate compound" means a hydrated ionic compound having a general chemical formula of $aX \cdot cH_2O$ or $aX \cdot bY \cdot cH_2O$, wherein "X" is a first ionic compound, "Y" is a second ionic compound, "a" is the number of molecules of the first ionic compound in the hydrate compound, "b" is the number of molecules of the second ionic compound in the hydrate compound, and "c" is the number of water molecules in the hydrate compound.

Embodiments of the present disclosure relate to an engineered flooring product (e.g. a flooring plank) suitable for indoor or outdoor flooring applications. The engineered flooring product comprises a core layer, the core layer having a composition comprising: (i) a first hydrate compound comprising magnesium hydroxide and magnesium chloride; (ii) one or more second hydrate compounds each comprising magnesium hydroxide and magnesium sulfate; and (iii) one or more stabilizing agents. The flooring product can comprise interlocking means that enable the flooring products to physically interlock with compatible interlocking means of other flooring products. The flooring product can include a top finishing layer and a backing layer that are affixed to and sandwich the core layer. The top finishing layer can be a decorative veneer or a décor sheet, and be covered by a wear layer Instead of a top finishing layer, the flooring product can have decorative features applied directly onto the top of the core layer, with a wear layer applied onto the decorative features.

The engineered flooring product is manufactured without incorporating PVC (recycled or virgin) and/or formaldehyde into the engineered flooring product. As such, the core layer has a composition that is free of PVC. As contemplated herein, the core layer also does not comprise any plastic-based products or materials. The composition of the core layer may provide one or more desired physical properties such as, but not limited to, a desired degree of water resistance, durability, and thermal expansion and contraction. The engineered flooring product may be embodied as a plurality of interconnecting planks, tiles or other relatively thin and flat shapes (herein referred to as "flooring pieces").

Magnesium oxide ("MgO") is a natural metal oxide mineral that is generally resistant to mold, fungus, insects, and fire. The production of MgO may consume less energy than the production of other materials that may be used for similar applications. For example, MgO may be removed from ore at about 25% of the temperature required to form CaO, a starting material in common mortar. When MgO ground into a powder and combined with water, a cement-like mixture can be formed.

Flooring Product

Figure 1:
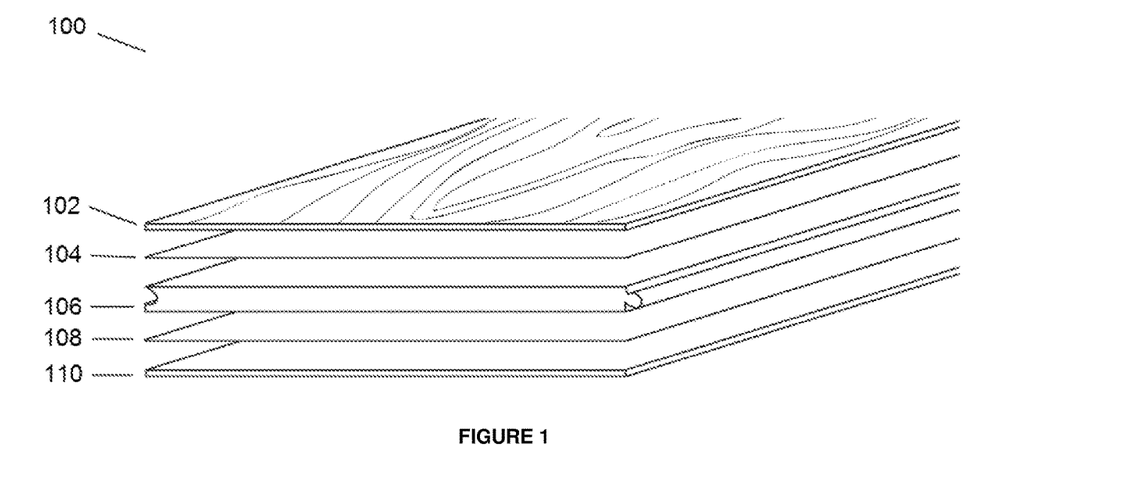
FIG. 1 is an exploded view of an engineered flooring product, according to an embodiment, the engineered flooring product comprising a top layer, a core layer and a backer layer.
Figure 2:
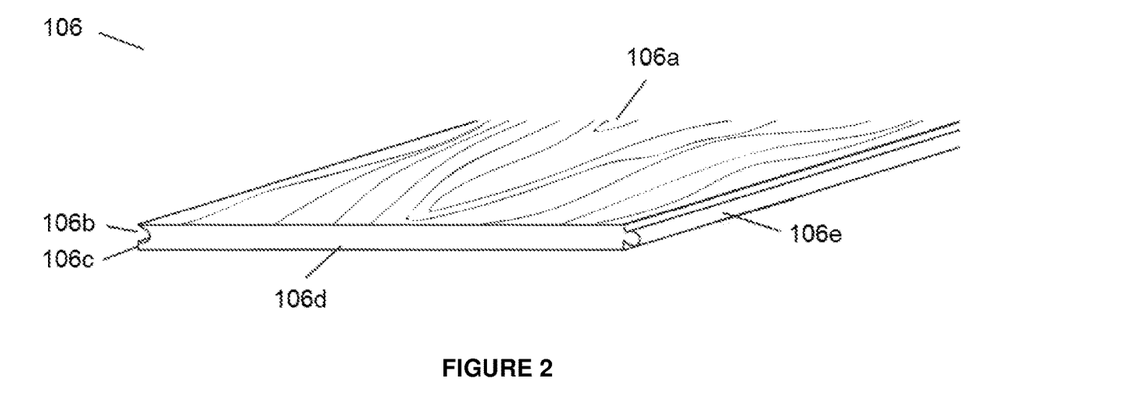
FIG. 2 is a perspective view of the core layer of the engineering flooring product depicted in FIG. 1.

Referring to FIGS. 1 and 2, and according to a first embodiment of the disclosure, there is an engineered flooring product 100 suitable for indoor or outdoor flooring applications, the engineered flooring product 100 comprising a core layer 106, the core layer 106 comprising: (i) a first hydrate compound comprising magnesium hydroxide and magnesium chloride; (ii) one or more second hydrate compounds each comprising magnesium hydroxide and magnesium sulfate; and (iii) one or more stabilizing agents. The product 100 comprises a top finishing layer 102, a first coupling material 104, the core layer 106, a second coupling material 108, and a backer layer 110. The top finishing layer 102, core layer 106, and backer layer 110 are generally aligned in parallel to each other and coupled together by the first and second coupling materials 104, 108.

The top finishing layer 102 comprises a top surface that is distal from the core layer 106, a bottom surface that is proximal to a top surface 106a of the core layer 106. The top finishing layer 102 is made of a suitable decorative material including, but not limited to, plastic laminate, melamine, stone, ceramic tile, wood, or cork. Some of these materials are naturally water impermeable; other materials can be treated by techniques known in the art to render them water impermeable.

The top finishing layer 102 can optionally include a wear layer. The wear layer is designed to protect the engineered flooring product 100 against physical damage such as, but not limited to, any suitable use of the engineered flooring product 100 as a flooring product (e.g. walking on the engineered flooring product 100). The wear layer may also contribute to the aesthetic appeal of the product through texture and glossiness. The wear surface is created by techniques which are known in the art. For example, the wear layer is formed as the top portion of the top finishing layer 102 by applying a solution or mixture of water and a wear material (such as but not limited to aluminum oxide) with a curtain or roller coater onto the top surface of the top finishing layer 102, and allowing the solution or mixture to air-dry or cure with ultraviolet light. In another example, the wear layer is formed by known techniques such as ceramic tile firing. In another example, the wear layer can be formed of thermal-fused plastics such as, but not limited to, melamine. Using melamine as an example, the top finishing layer 102 can comprise a melamine layer that is heat-cured. In another example, the top finishing layer 102 can be lacquered finished via curing with UV-light.

The top finishing layer 102 is affixed to the core layer 106 by the first coupling material 104. The first coupling material 104 is disposed between the top layer 102 and the core layer 106, and affixes the bottom surface of the top layer 102 to the top surface 106a of the core layer 106. The first coupling material 104 may be any suitable material known in the art that can affix the top finishing layer 102 to the core layer 106. As contemplated in this embodiment, the first coupling material 104 is a waterproof adhesive or glue that is known in the art, such as a hot melt adhesive or cold-set adhesive.

The core layer 106 comprises: (i) a first hydrate compound comprising magnesium hydroxide and magnesium chloride; (ii) one or more second hydrate compounds each comprising magnesium hydroxide and magnesium sulfate; and (iii) a stabilizing agent. The combination of the first hydrate compound comprising magnesium hydroxide and magnesium chloride and the one or more second hydrate compounds each comprising magnesium hydroxide and magnesium sulfate is between 40 and 95 wt. % of the core layer 106. As contemplated herein, the stabilizing agent is between 1 and 30 wt. % of the core layer 106. The core layer can optionally include anti-oxidation agents, catalysts, colorants, reinforcing agents, and modifiers.

The stabilizer agent of the core layer 106 is a fibrous material that provides stability to the core layer 106. Suitable fibrous materials include, but are not limited to: an organic fibrous material such as wood or another plant-based fibrous material such as sawdust or bamboo-dust, a glass-based material such as coated fibreglass or anti-alkaline fibreglass, a glass-fibre yarn, a chemical fibre, a plastic fibre, a mineral fibre, a carbon fibre, or any combination thereof.

The binding agent in the core layer 106 also improves the stability and durability of the core layer 106. The binding agent includes, but is not limited to, magnesium chloride (incorporated as a part of one or more hydrated compounds in the final flooring product), magnesium sulfate (incorporated as a part of one or more hydrated compounds in the final flooring product), potassium phosphate, fly ash, and acticarbon.

The anti-oxidant agent may be a metal oxide mineral or a limestone based-derivative. For example, the anti-oxidant agent may be the magnesium oxide, which is then transformed into a magnesium hydroxide based hydrate compound during the manufacturing of the flooring product 100.

The colorant may be selected from any suitable dyes, inks, oxide minerals (e.g. iron oxide) or other colorants such as, but not limited to, carbon.

The catalyst is used during the manufacturing of the core layer 106 to improve the setting times of the core layer 106. The catalysts may be any suitable catalyst known in the art, and may be consumed during the manufacturing process.

Modifiers are used in the manufacturing of the core layer 106 to improve the efficiency of the manufacturing process and enhance the strength and stability of the core layer 106. Suitable modifiers include, but are not limited to, sulfonate salts (e.g. sodium naphthalenesulfonate), sulfate salts (e.g. sodium alcohol ether sulfate, aluminum sulfate), Peregal, and modifier polymers known in the art. Modifiers may be consumed during the manufacturing process.

In some embodiments, the core layer 106 further comprises a filling material that reduces the density and weight of the core layer 106 without compromising the desired characteristics of the core layer 106, An example filling material is pearl rock.

The core layer 106 generally has the following material composition:

TABLE 1

| Material | Percent/by weight (finished product) |
|---|---|
| The combination of the first hydrate compound comprising magnesium hydroxide and magnesium chloride and the one or more second hydrate compounds each comprising magnesium hydroxide and magnesium sulfate | 40-95% |
| fibrous material (stabilizing agent) | 1-30% |
| Filling material (for example, but not limited to, pearl rock) | 0-30% |
| water | 0-8% |
| Binding material (excluding magnesium chloride and magnesium sulfate) | 0-10% |

For example, the flooring product 100 can comprise a hydrate compound comprising magnesium hydroxide with a percent by weight of the flooring product 100 of 40-95%, 45-95%, 50-95%, 55-95%, 60-95%, or any specific percentage therebetween.

In a first example, the core layer 106 has the following material composition:

TABLE 2

| Material | Percent/by weight (finished product) |
|---|---|
| $5Mg(OH)_2 \cdot MgCl_2 \cdot 8H_2O$, and $5Mg(OH)_2 \cdot MgSO_4 \cdot 5H_2O$ | 40-95% |
| $5Mg(OH)_2 \cdot MgSO_4 \cdot 3H_2O$ | 0-30% |
| $3Mg(OH)_2 \cdot MgSO_4 \cdot 8H_2O$ | 0-30% |
| $MgKPO_4 \cdot 6H_2O$ | 0-8% |
| $Mg_3(PO_4)_2 \cdot 3H_2O$ | 0-10% |
| Fibrous Material | 1-40% |
| Fly Ash | 0-10% |
| Anti-alkaline fiberglass | 0-4% |
| Pearl Rock | 0-30% |
| Water | 0-8% |

In a second example, core layer 106 has the following material composition:

TABLE 3

| Material | Percent/by weight (finished product) |
|---|---|
| $5Mg(OH)_2 \cdot MgCl_2 \cdot 8H_2O$ | 30% |
| $5Mg(OH)_2 \cdot MgSO_4 \cdot 5H_2O$ | 25% |
| $5Mg(OH)_2 \cdot MgSO_4 \cdot 3H_2O$ | 3% |
| $3Mg(OH)_2 \cdot MgSO_4 \cdot 8H_2O$ | 7% |
| $MgKPO_4 \cdot 6H_2O$ | 3% |
| $Mg3(PO_4)_2 \cdot 3H_2O$ | 2% |
| Fibrous Material | 10% |
| Fly Ash | 9% |
| Anti-alkaline fiberglass | 2% |
| Pearl Rock | 7% |
| Water | 2% |

A core layer 106 having one of the compositions provided in Table 1, 2, or 3 preferably has a thermal expansion coefficient of about $10 \times 10^{-6}/°$ C., which is about equivalent to or comparable to that of concrete. Such a thermal expansion coefficient amounts to a core layer 106 length extension/contraction of about 1.7 centimeters for about every 30.5 meters (100') within a given 60 degrees Celsius temperature range in 24 hours. For indoor product applications where the temperature range is less extreme, any change in length of the engineered flooring product 100 is expected to be generally negligible and not expected to affect the performance and/or aesthetic appeal of the engineered flooring product 100 over its lifetime.

For outdoor use where temperature variations can be extreme, any veneer or other top finishing layer material should be selected to have a similar thermal expansion co-efficient to ensure that cracking or other damage does not occur. For example, a stone veneer has a similar expansion coefficient to the core layer 106 and thus could be used as a veneer of the top finishing layer for outdoor use. Beneficially, expansion gaps that compensate for any experienced thermal expansion of a flooring product can therefore be utilized to a lesser degree or completely eliminated.

The relative stability and low thermal expansion coefficient of the core layer 106 permits brittle layers that have low thermal coefficients of expansion that are similar to that of the core layer 106 to be coupled to the top surface 106a of the core layer 106 with minimal risk of cracking due to thermal expansion or contraction of the core layer 106, Brittle layers include, but are not limited to, thin ceramic or porcelain tile or stone. In addition, the high density and stable vertical layer structure characteristics of the core layer 106 may allow it to be utilized as a flooring core layer and to be milled with a "tongue and groove" glue-less connection system.

In addition, it is expected that the core layer 106 having the composition in Table 1, 2, or 3 also has other desirable properties, including:

Temperature resistance. The core layer 106 is not expected to deform at temperatures of up to 300° C., thereby allowing the engineered flooring product to be formed by hot press (e.g. where coupling materials such as coupling materials 104, 108 are heat activated). The core layer 106 may also be incorporated as the core layer 106 for laminate flooring or powder coat technology.

Water resistance. The core layer 106 is not expected to substantially change dimensions or shape when in contact with water, and may therefore be used in areas of high moisture content (e.g. bathrooms and kitchens).

Structurally, the core layer 106 is an elongated substrate having interconnecting means at two or more straight side edges that physically interconnect one piece of the engineered flooring product 100 to other pieces of the flooring product 100. In an embodiment, each flooring product piece 100 comprises a "tongue and groove" system (e.g. "click-lock" system) as shown in FIG. 2 that allows pieces of the engineered flooring product 100 to be connected and installed together without the use of adhesives (e.g. glue). In such a "tongue and groove" system, the core layer 106 comprises a recess 106b (e.g. groove) and a recess lip 106c that extend laterally along a length of a first side of the core layer 106, and a protrusion 106e (e.g. tongue) that extends laterally along a length of an opposite second side of the core layer 106 and protrudes away from the core layer 106. The recess 106b of a first engineered flooring product piece 100 is configured to receive a protrusion 106e of an adjacent second engineered flooring product piece 100 such that the first and second engineered flooring product pieces 100 are mechanically coupled together. The recess lip 106c assists in maintaining the coupling of the recess 106b of the first engineered flooring product 100 to the protrusion 106e of the adjacent second engineered flooring product 100. The core layer 106 further comprises a side 106d extending between the recess 106b and the protrusion 106e of the core layer 106. In other embodiments, adjacent pieces of the engineered floor product 100 are coupled together by a "click-lock" system and adhesives to lock the joints between adjacent engineered floor products 100 together. In other embodiments, the core layer 106 comprises an angle fold system where the long edge of the plank is engaged and then folded into position and the short edges are engaged at the same time the long side is engaged during the folding motion (see for example EP 1,415,056). In other embodiments, the flooring product 100 does not have a "tongue and groove" or "click-lock" like system, and instead has an adhesive back that can be directly applied and affixed to the floor below the flooring product 100.

Optionally, a sheet of stabilizing material (not shown), such as a fibreglass sheet, is disposed in the core layer 106 along the longitudinal axis of the core layer 106 to provide stability to the core layer 106. The stabilizing material may be embedded into the core layer 106 during the core layer forming process. In other embodiments, a sheet made of stabilizing material may be disposed between the top layer 102 and the core layer 106, the core layer 106 and the backer layer 110, or both.

The backer layer 110 is coupled to a bottom surface of the core layer 106 by a second coupling layer 108, and may be made of a suitable material known in the art. For example, the backer layer may be made of cork, foam, felt, foam, or rubber. The backer layer 110 has various potential applications. In an example, the backer layer 110 provides a cushion layer that overcomes or reduces the effects of minor defects (e.g. surface unevenness) in the subfloor. In another example, the backer layer 110 serves to reduce or eliminate the amount of noise transferred through the engineered flooring products 100 to the subfloor. An engineered flooring product 100 that comprises a backer layer 110 that is pre-coupled to a core layer 106 reduces the time and labour required for installing the engineered flooring product 100. In other embodiments, the backer layer 110 is not pre-coupled to the core layer 106. In other embodiments, the backer layer 100 is of a "peel and stick" variety. In other embodiments, the engineered flooring product 100 does not comprise the backer layer 110. Preferably, the backer layer 110 is waterproof and is manufactured of a closed cell foam material or a naturally waterproof material such as, but not limited to, cork. In other embodiments, the backer layer 110 may be non-waterproof.

The engineered flooring product 100 may further comprise a décor layer that provides the cosmetic look or aesthetic appeal of the engineered flooring product. The décor layer may be a sheet of decorative printed paper that is directly printed onto the top finishing layer 102 digitally or with rotogravure printing.

Figure 3:
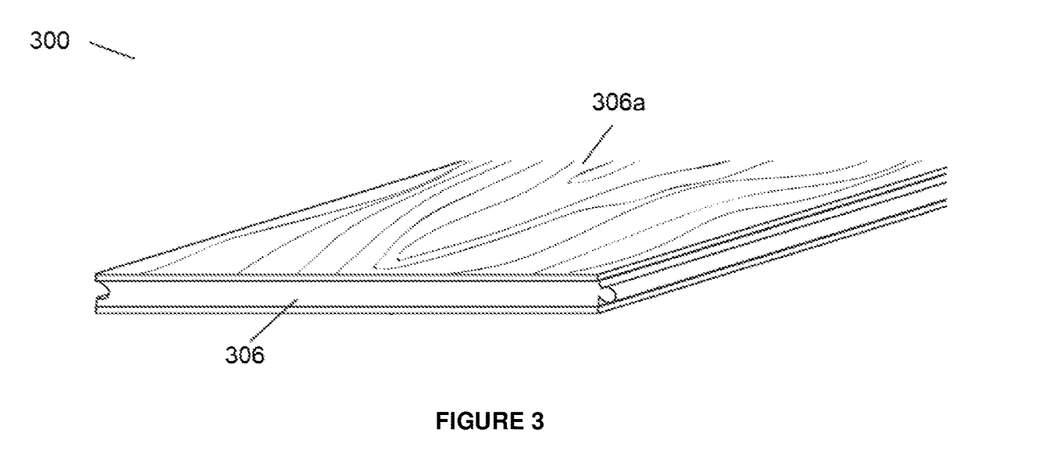
FIG. 3 is a perspective view of an engineered flooring product according to another embodiment, the engineered flooring product comprising a core layer and a wear surface on the core layer.

Referring to FIG. 3, and according to a second embodiment of the disclosure, there is an engineered flooring product 300 that does not comprise a top layer. Instead, a top surface 306a of the core layer 306 is directly treated to perform as a décor and wear surface. The decorative surface on the core layer 306 is created by techniques known in the art. For example, top surface 306a can be rendered decorative within the mixture of the core layer 306 itself, with dyes and/or colouring agents that are added and mixed to the desired colour. The top surface 306a is optionally sealed with lacquer or glaze that may be UV-cured or heat-cured. A wear surface on the top surface 306a can also be created by techniques which are known in the art such as, but not limited to, plate pressing, multi-pass printing, and hot-meld techniques. In an example, a wear surface is created on the core layer 306 by applying a solution or mixture with a curtain or roller coater onto the top surface 306a and allowing the solution or mixture to dry on the top surface 306a. The solution or mixture comprises a wear resistance material such as, but not limited to, aluminum oxide. In another example, the wear surface is cured onto the top surface of the product 300 by heat or ultra-violet rays.

Engineered flooring products 100, 300 are generally manufactured in typical flooring dimensions. For designs that mimic the appearance of wood flooring, the engineered flooring products generally have a width of 2.5" to 12" and a length of 24" to 96". For designs that mimic the appearance of tile and/or stone, the engineered flooring products are generally formed in a square or rectangular shape. Engineered flooring products that are square shaped generally have size dimensions ranging from 12"×12" to 48"×48". The thickness of the engineered flooring product depends on the application of the engineered flooring products. Typical thicknesses generally range from 4 mm (0.16") to 20 mm (0.79"), Manufacturing of the Core Layer of the Flooring Product The core layer is manufactured by milling magnesium oxide into a powder with stabilizing fibrous material and binding agents. Other agents including anti-oxidation agents, catalysts, stabilizers, colorants, reinforcing agents, filling material, and modifiers, may also be milled with magnesium oxide, stabilizing fibrous material and binding agents. Water can be added during or after the milling of magnesium oxide into a powder with stabilizing fibrous material and binding agents.

A batch of the raw materials (for example, the materials listed in any one of Tables 4, 5, and 6 below) is mixed in a suitable mixer such as, but not limited to, an industrial mixer to create batches of raw material slurry that are collected at forming stations. Mixing occurs at room temperature and lasts between 5 and 15 minutes per batch.

TABLE 4

| Ingredient | Percent/by weight (finished product) |
| --- | --- |
| magnesium oxide | 40-70% |
| binding agent | 10-45% |
| fibrous material (stabilizing agent) | 5-40% |
| Filling material | 0-30% |
| catalyst | 0-1% |
| water | 8-15% |
| Modifier and colourant | 0-4% |

TABLE 5

| Ingredient | Percent/by weight (finished product) |
| --- | --- |
| magnesium oxide | 40-70% |
| magnesium chloride, magnesium sulfate, or both (binding agent) | 10-30% |
| fibrous material (stabilizing agent) | 1-40% |
| fly ash, acticarbon, magnesium silicate, potassium phosphate, or any combination thereof (binding agent) | 0-10% |
| anti-alkaline fiberglass | 0-4% |
| pearl rock (filling material) | 0-30% |
| Catalyst | 0-1% |
| Water | 8-15% |
| sodium naphthalenesulfonate, sodium alcohol ether sulphate, Peregal, polymers, aluminum sulfate, iron oxide, or any combination thereof (modifiers and colourants) | 0-4% |

TABLE 6

| Ingredient | Percent/by weight |
| --- | --- |
| magnesium oxide | 40% |
| Combination of magnesium chloride, magnesium sulfate, and potassium phosphate (binding agent) | 20% |
| Fibrous Material (stabilizing agent) | 10% |
| Fly Ash (binding agent) | 9% |
| Anti-Alkaline Fibre glass (stabilizing agent) | 2% |
| Pearl Rock (filling material) | 7% |
| Catalyst | 1% |
| Modifier | 1% |
| H$_2$O | 10% |
| | Total: 100% |

In an example manufacturing process of a core layer of a flooring product, cull plates or platens (onto which the core layers are formed) are fed onto a forming line. A releasing agent is first applied onto the surface of the cull plates. A releasing agent prevents any materials subsequently applied to the cull plate from adhering to the cull plate. Suitable releasing agents are known in the art including, but not limited to, silicon oil and soap. A first layer of raw material slurry composed of magnesium oxide, stabilizing fibrous material, and binding agents is poured and smoothed onto the releasing agent covered cull plates. The first layer of raw material slurry may also compose other agents including anti-oxidation agents, colorants, and reinforcing agents.

A sheet of stabilizing material (for example, but not limited to, a fibreglass sheet) is laid over the first layer of raw material slurry. A second layer of raw material slurry composed of magnesium oxide, stabilizing fibrous material, and binding agents is poured and smoothed over the stabilizing material. The second layer of raw material slurry may also compose other agents including anti-oxidation agents, colorants, and reinforcing agents.

The layers of uncured raw material slurry forming the core layer, supported by the cull plate, are then cured in an industrial-sized drying oven for about 12 hours in an environment where the internal temperature of each curing core layer will reach about 60° C. The cured core layers are then released from the cull plate, trimmed, and sanded to the appropriate dimensions and finish. Cured core layers are further cooled for about a 24 period at about 10-30° C. to release internal stress within the cured core layers 106.

While heat may accelerate the curing process, the application of heat during the casting process is not required. No extrusion is required in the manufacture of the core layers contemplated herein.

In other examples, the sheet of stabilizing material is not contained within the core layer.

It is contemplated that any part of any aspect or embodiment discussed in this specification can be implemented or combined, with any part of any other aspect or embodiment discussed in this specification. While particular embodiments have been described in the foregoing, it is to be understood that other embodiments are possible and are intended to be included herein. It will be clear to any person skilled in the art that modification of and adjustment to the foregoing embodiments, not shown, is possible.

What is claimed is:

1. A method of manufacturing an engineered flooring product comprising a core layer, the core layer comprising a first hydrate compound comprising magnesium hydroxide and magnesium chloride, one or more second hydrate compounds each comprising magnesium hydroxide and magnesium sulfate, and one or more stabilizing agents, the method comprising:
   (a) mixing at least magnesium oxide, magnesium chloride, magnesium sulfate, the one or more stabilizing agents, and water in a mixer, thereby forming a raw material slurry;
   (b) spreading a first layer of the raw material slurry onto a cull plate;
   (c) laying at least one sheet of stabilizing material on the first layer of the raw material slurry;
   (d) spreading a second layer of the raw material slurry on the sheet of stabilizing material, thereby forming said core layer;
   (e) curing said core layer;
   (f) after said step (e), releasing said cured core layer from said cull plate;
   (g) after said step (f), trimming said cured core layer released from said cull plate; and
   (h) after said step (g), cooling said cured core layer released from said cull plate for at least about 24 hours at a temperature ranging from about 10° C.-30° C. to release internal stress within the cured core layer, thereby forming said engineered flooring product, said engineered flooring product having a thickness ranging from about 4 mm to about 20 mm.

2. The method according to claim 1, wherein said step (e) further comprises curing said core layer at a temperature of about 60° C.

3. The method according to claim 1, wherein said step (e) further comprises curing said core layer for a curing time of about 12 hours.

4. The method according to claim 1, further comprising the step of providing said first layer of said raw material slurry with an agent selected from the group consisting of anti-oxidation agents, colorants, reinforcing agents, and combinations thereof.

5. The method according to claim 1, further comprising the step of, prior to said step (b), applying a releasing agent onto a surface of said cull plate.

6. The method according to claim 1, further comprising the step of, prior to said step (e), smoothing said second layer of said raw material slurry.

7. The method according to claim 1, further comprising the step of providing said second layer of said raw material slurry with one or more agents selected from the group consisting of anti-oxidation agents, colorants, reinforcing agents, and combinations thereof.

8. The method according to claim 1, further comprising the step of, prior to said step (h), sanding said cured and trimmed core layer released from said cull plate.

9. The method according to claim 1, wherein said magnesium oxide is provided as magnesium oxide powder formed by milling magnesium oxide into said powder.

10. The method according to claim 9, wherein said step of milling into a powder further comprises the step of mixing one or more agents with said magnesium oxide provided for said milling, said one or more agents selected from the group consisting of anti-oxidation agents, catalysts, stabilizers, colorants, reinforcing agents, filling material, modifiers, and combinations thereof.

11. The method according to claim 9, further comprising the step of adding water during said milling of said magnesium oxide into a powder.

12. The method according to claim 9, further comprising the step of adding water to said magnesium oxide a powder.

13. The method according to claim 1, wherein said step (a) further comprises mixing said at least magnesium oxide, said magnesium chloride, said magnesium sulfate, said one or more stabilizing agents, and said water at room temperature.

14. A method of manufacturing an engineered flooring product comprising a core layer, the core layer comprising a first hydrate compound comprising magnesium hydroxide and magnesium chloride, one or more second hydrate compounds each comprising magnesium hydroxide and magnesium sulfate, and one or more stabilizing agents, the method comprising:
   (a) mixing at least magnesium oxide, magnesium chloride, magnesium sulfate, the one or more stabilizing agents, and water in a mixer, thereby forming a raw material slurry;
   (b) spreading a first layer of the raw material slurry onto a cull plate, thereby forming a first layer of said core layer;
   (c) curing the first layer of raw material slurry;
   (d) after said step (c), releasing said cured first layer of raw material slurry from said cull plate;
   (e) after said step (d), trimming said cured first layer of raw material slurry released from said cull plate;
   (f) after said step (e), sanding said cured and trimmed first layer of raw material slurry released from said cull plate; and (g) after said step (f), cooling said cured first layer of raw material slurry released from said cull plate for at least about 24 hours at a temperature ranging from about 10° C.-30° C. to release internal stress within the cured first layer, thereby forming said engineered flooring product, said engineered flooring product having a thickness ranging from about 4 mm to about 20 mm.

15. The method according to claim 14, further comprising prior to said step (c), laying a sheet of stabilizing material on the first layer of the raw material slurry and spreading a second layer of the raw material slurry on the sheet of stabilizing material.

16. The method according to claim 15, wherein said step (c) further comprises curing the second layer of raw material slurry.

17. The method according to claim 14, wherein said step (c) further comprises curing said first layer of raw material slurry at a temperature of about 60° C.

18. The method according to claim 14, wherein said step (c) further comprises curing said first layer of raw material slurry for a curing time of about 12 hours.

19. The method according to claim 14, further comprising the step of providing said first layer of said raw material slurry with an agent selected from the group consisting of anti-oxidation agents, colorants, reinforcing agents, and combinations thereof.

20. The method according to claim 14, further comprising the step of, prior to said step (b), applying a releasing agent onto a surface of said cull plate.

\* \* \* \* \*